US010318691B2

(12) United States Patent
Sarrazin et al.

(10) Patent No.: US 10,318,691 B2
(45) Date of Patent: Jun. 11, 2019

(54) TIMING ANALYSIS AND OPTIMIZATION OF ASYNCHRONOUS CIRCUIT DESIGNS (71) Applicant: Wave Computing, Inc., Campbell, CA (US)

(72) Inventors: Philippe Francis Sarrazin, San Jose, CA (US); Roger David Carpenter, San Francisco, CA (US)

(73) Assignee: Wave Computing, Inc., Campbell, CA (US)

(*) Notice: Subject to any disclaimer, the term of this patent is extended or adjusted under 35 U.S.C. 154(b) by 171 days.

(21) Appl. No.: 15/628,307

(22) Filed: Jun. 20, 2017

(65) Prior Publication Data

US 2017/0371993 A1 Dec. 28, 2017

Related U.S. Application Data (60) Provisional application No. 62/353,202, filed on Jun. 22, 2016.

(51) Int. Cl.
*G06F 17/50* (2006.01)

(52) U.S. Cl.
CPC ...... *G06F 17/5059* (2013.01); *G06F 17/5031* (2013.01); *G06F 17/5068* (2013.01); *G06F 17/5081* (2013.01); *G06F 17/505* (2013.01); *G06F 2217/84* (2013.01)

(58) Field of Classification Search
None
See application file for complete search history.

(56) References Cited

U.S. PATENT DOCUMENTS

| 5,305,463 | A | 4/1994 | Fant et al. |
| 5,355,496 | A | 10/1994 | Fant et al. |
| 5,572,732 | A | 11/1996 | Fant et al. |
| 5,640,105 | A | 6/1997 | Sobelman et al. |
| 5,652,902 | A | 7/1997 | Fant |
| 5,656,948 | A | 8/1997 | Sobelman et al. |
| 5,664,211 | A | 9/1997 | Sobelman et al. |
| 5,664,212 | A | 9/1997 | Fant et al. |
| 5,764,081 | A | 6/1998 | Fant et al. |
| 5,793,662 | A | 8/1998 | Duncan et al. |
| 5,796,962 | A | 8/1998 | Fant et al. |
| 5,805,461 | A | 9/1998 | Fant et al. |

(Continued)

OTHER PUBLICATIONS

K. M. Fant et al., "NULL Convention Logic: A Complete and Consistent Logic for Asynchronous Digital Circuit Synthesis," 1996 IEEE, pp. 261-273. (Year: 1996).*

(Continued)

*Primary Examiner* — Leigh M Garbowski
(74) *Attorney, Agent, or Firm* — Adams Intellex, PLC (57) ABSTRACT Methods and systems for timing analysis and optimization of asynchronous circuit designs are disclosed. Registration stages are placed between combinational logic circuits. For timing purposes, the registration stages are modified to have a duplicate set of pins. New paths are formed in the circuit for the purposes of timing analysis. The paths are analyzable by timing tools. Once the timing analysis is complete, the paths are reverted to original paths, and new devices are selected for the circuit design based on results of the timing analysis. An updated design is sent for manufacture, based on the timing analysis and optimization of the asynchronous circuit.

26 Claims, 7 Drawing Sheets (56) References Cited

U.S. PATENT DOCUMENTS

| | | |
|---|---|---|
| 5,828,228 A | 10/1998 | Fant et al. |
| 5,896,541 A | 4/1999 | Fant et al. |
| 5,907,693 A | 5/1999 | Fant et al. |
| 5,930,522 A | 7/1999 | Fant |
| 5,977,663 A | 11/1999 | Fant et al. |
| 5,986,466 A | 11/1999 | Sobelman et al. |
| 6,020,754 A | 2/2000 | Sobelman et al. |
| 6,031,390 A | 2/2000 | Fant et al. |
| 6,043,674 A | 3/2000 | Sobelman |
| 6,052,770 A | 4/2000 | Fant |
| 6,128,678 A | 10/2000 | Masteller |
| 6,262,593 B1 | 7/2001 | Sobelman et al. |
| 6,275,841 B1 | 8/2001 | Potter et al. |
| 6,308,229 B1 | 10/2001 | Masteller |
| 6,313,660 B1 | 11/2001 | Sobelman et al. |
| 6,327,607 B1 | 12/2001 | Fant |
| 6,333,640 B1 | 12/2001 | Fant et al. |
| 6,526,542 B2 | 2/2003 | Kondratyev |
| 6,900,658 B1 | 5/2005 | Sobelman et al. |
| 7,053,662 B1 | 5/2006 | Silver et al. |
| 7,478,222 B2 | 1/2009 | Fant |
| 7,930,517 B2 | 4/2011 | Fant |
| 7,977,972 B2 | 7/2011 | Di et al. |
| 3,020,145 A1 | 9/2011 | Fant |
| 3,026,741 A1 | 9/2011 | Takayanagi |
| 8,078,839 B2 | 12/2011 | Fant |
| 8,086,975 B2 | 12/2011 | Shiring et al. |
| 8,972,915 B2 * | 3/2015 | Prakash .............. G06F 17/5031 716/106 |
| 2006/0233006 A1 | 10/2006 | Fant |
| 2009/0204788 A1 | 8/2009 | Fant |

OTHER PUBLICATIONS

S. Masteller et al., "Cycle Decomposition in NCL," IEEE Design & Test of Computers, Nov.-Dec. 2003, pp. 38-43. (Year: 2003).*

M . T. Moreira et al., "Automated Synthesis of Cell Libraries for Asynchronous Circuits," SBCCI'14, ACM 2014, 7 pages. (Year: 2014).*

"Glitch-Free Design for Multi-Threshold CMOS NCL Circuits", by Al Zahrani, et al., GLIVLSI'09, May 10-12, 2009, Boston, Massachusetts, Copyright 2009 ACM 978-1-60558-522-2/09/05, 6 pages.

* cited by examiner

TIMING ANALYSIS AND OPTIMIZATION OF ASYNCHRONOUS CIRCUIT DESIGNS

RELATED APPLICATIONS

This application claims the benefit of U.S. provisional patent application "Timing Analysis and Optimization of Asynchronous Circuit Designs" Ser. No. 62/353,202, filed Jun. 22, 2016. The foregoing application is hereby incorporated by reference in its entirety.

FIELD OF ART

This application relates generally to electronic circuitry and more particularly to timing analysis and optimization of asynchronous circuit designs.

BACKGROUND

Electronic circuits are used in a wide variety of applications and products for many purposes, including communication, audio/video, security, general and special purpose computing, data compression, digital signal processing, and medical devices, to name a few. Current consumer trends focus on increasingly powerful devices with increased portability. It can prove challenging to achieve more processing power while simultaneously improving energy efficiency. Improved energy efficiency translates to longer battery life, which is an important factor in the design and use of portable electronic devices. To enable small form factor devices to have complex functionality along with efficiency in power consumption, designers often utilize a system-on-chip (SoC).

SoCs are constructed using a variety of modules and/or sub-systems used to perform specific functions. These are integrated together with a communication medium (such as a system bus). Each module can have different timing requirements. The integration of modules with varying clock and timing requirements can create challenges in the designing, testing, and verification of complex SoCs.

Timing is an important consideration in the design of a complex circuit or SoC. In practice, the arrival time of a signal can vary for many reasons. The various values on input data can cause different operations or calculations to be performed, introducing a delay in the arrival of a signal. Furthermore, operating conditions such as temperature can affect the speed at which circuits may perform. Variability in the manufacture of parts can also contribute to timing differences. Properties such as the threshold voltage of transistors, the width of metallization layers, and dopant concentrations are examples of parameters that can vary during the production of integrated circuits, potentially affecting timing.

A large-scale architecture with many subsystems can typically result in a large number and variety of interacting clock domains. Synchronizing all the clock domains can be rendered difficult by engineering costs, power consumption, and project-level risks. Accordingly, such architectures and designs increasingly utilize multiple asynchronous clock domains. The use of a variety of different domains can make timing analysis even more challenging.

Designers of SoCs and other integrated circuits often need to transfer data between multiple subsystems. This data may include asynchronous data such as control and configuration commands, isochronous data such as video packets that have strict temporal and jitter requirements, and/or other synchronous, periodic data. Some applications require high levels of data integrity and/or bandwidth. Systems and methods of data transfer between such entities are an invaluable part of modern logic circuit design. A thorough characterization of timing behavior across a variety of conditions is essential for a circuit designer. The timing between various sections or modules may need to be understood and verified across a range of operating conditions, as the timing can be important for functions such as data transfer. Timing analysis continues to be an invaluable part of modern logic circuit design.

SUMMARY

Asynchronous circuit designs provide for efficient circuits with reduced clock circuitry, allowing for size and power savings. Additionally, asynchronous circuits can provide numerous benefits, including reduced peak currents as a function of clock edges. Power consumption can be more uniform since technologies such as Null Convention Logic have similar electromagnetic signatures between a logical "0" and a logical "1". Asynchronous circuits can also provide robustness, featuring more immunity to technology and environment variations such as temperature, power supply conditions, and the like. Yet another advantage of asynchronous circuit design is its ability to adapt to the speed of any two communicating circuits or modules. Maximum flexibility is achieved when no technology constraints are forced by timing requirements. Unlike a synchronous system, where all participating circuits are designed with the same timing constraints in mind, a technology-independent module is designed without any assumptions about the timing of the rest of the system. Instead, each asynchronous circuit simply guarantees that its data is valid on the bus before it issues its synchronization signal, and each receiving circuit is responsible for ensuring that its data has been successfully latched before issuing an acknowledge. The protocol itself imposes no artificial set-up or hold time limitations, hence providing greater flexibility for such designs.

However, the use of asynchronous circuits can complicate the timing analysis phase of the design of such a circuit, given the state of existing timing tools. In embodiments, various circuit elements are duplicated, such that there is a set of normal pins and a set of dummy pins. For analysis purposes, the design is modified such that connections are changed from a normal input to a dummy input of certain circuit elements, thus creating a path for timing purposes. This path can be analyzed using conventional timing tools. Based on the timing, optimizations can be performed, such as selecting different sizes of various transistors, in order to achieve an optimal balance between timing and power consumption. Based on the analysis, the production design is modified to use the new sizes of transistors. This allows effective timing analyses to be performed on asynchronous circuit designs, which enables more reliable integrated circuits and SoC-based products.

Embodiments provide a computer-implemented method for timing optimization comprising: obtaining a description of an asynchronous circuit wherein the asynchronous circuit includes a timing loop; identifying a plurality of registration stages within the asynchronous circuit; creating a new timing cell library comprising cell models for the plurality of registration stages wherein the new timing cell library has duplicate timing pins of normal pins on registration cells; connecting from a first registration stage, from the plurality of registration stages, through a first combinational delay path to a duplicate input timing pin on a second registration stage, from the plurality of registration stages; disconnecting a connection from the first combinational delay path to a normal timing input pin on the second registration stage; and performing timing analysis on a path through the first registration stage through the first combinational delay path to the duplicate input timing pin on the second registration stage. In some embodiments, the creating the new timing cell library includes modifying a .lib file and a .lef file that describe connections and timings for cell models in the new timing cell library. In some embodiments, the method includes optimizing timing on the path through the first registration stage through the first combinational delay path to the duplicate input timing pin on the second registration stage. The method can include mapping back from registration cells, with duplicate timing pins, to registration cells without duplicate timings, wherein the registration cells without duplicate timing pins correspond to drive capabilities and timings of the registration cells with duplicate timing pins, after the timing analysis, as part of the reconnecting.

Various features, aspects, and advantages of various embodiments will become more apparent from the following further description.

BRIEF DESCRIPTION OF THE DRAWINGS

The following detailed description of certain embodiments may be understood by reference to the following figures wherein.

DETAILED DESCRIPTION

Currently, available tools are well-suited for analysis of clocked logic circuitry. However, they have significant shortcomings when the circuits include asynchronous sections. In cases where various asynchronous stages are interspersed between combinational logic circuit blocks, the current tools are not able to resolve such circuits optimally. It is desirable to be able to perform timing analysis and optimization on circuits of this nature while still maintaining the ability to use existing tools. Disclosed embodiments accomplish this analysis and optimization by modifying the circuit design for the purposes of timing analysis and then converting the design to a production state. The production state includes optimizing the selection of components within the asynchronous circuit to achieve preferred timing characteristics.

The use of asynchronous logic in a circuit design provides various advantages. Asynchronous logic may be "self-clocking" and thus, much of the conventional clocking circuitry required for synchronization of various elements can be eliminated. This difference removes various circuit elements, thus saving power and integrated circuit area. However, currently available timing tools are not able to effectively analyze such circuits.

Asynchronous logic can be implemented using Null Convention Logic (NCL). Null Convention Logic (NCL) has the advantage of offering compact circuit layout, effective logic signal detection, and storage using asynchronous logic circuits. Conventional digital logic circuits include logic elements which are continuously asserting a valid result, such as a logical "1" or a logical "0". As new data is input to a traditional Boolean digital logic circuit, the result asserted by the circuit might change several times before stabilizing at the correct result. In this type of a digital logic circuit, the determination of completion can be accomplished by a reference outside of the logic circuit, such as a system clock. The external reference (e.g. system clock) can be used to indicate when the output of the circuit is in a valid state for evaluation. The system clock allows enforcement of the sufficient settling time for the logic circuit to stabilize at the correct result before declaring the output states to be valid and ready to be evaluated.

NCL differs from traditional digital Boolean logic where each signal line may have one of two valid states. In traditional digital logic that uses a CMOS implementation, a low voltage level on a signal line means logical false or a "0" value. A high voltage level on the same line means logical true or a "1" value. Thus, a traditional digital logic signal can assume one of two values, both of which are valid. NCL includes a null state which indicates that no valid data has been propagated. For example, two separate signal lines can be used to convey two meaningful values. For example, logic "false" would be conveyed by asserting a high voltage on the first line and a low voltage on the second line. Logic "true" can be conveyed by asserting a low voltage on the first line and a high voltage on the second line. A null state is conveyed by low voltage levels on both lines. Simultaneous high voltage levels on both lines are an invalid input state and are not used.

NCL has certain advantages over traditional digital logic. One such advantage is that the presence of a meaningful value at an NCL circuit output is sufficient to indicate that the circuit has completed intermediate logic operations and the output is valid for use by additional circuits. Therefore, with NCL, no external clock is required to indicate that output data is available for use.

The NCL logic can be configured to make rings, and/or meshes that operate at a self-clocked "hum" frequency. At various points within a circuit design, registration stages are used to assert an output signal when one or more input conditions are met. In embodiments, the registration stages are implemented using one or more logical AND gates. The registration stages can be interspersed between combinational logic clusters, and the output of a registration stage can input to a combinational logic cluster. Each combinational logic cluster can include a combinational delay path, which represents a time for an input signal to propagate to cause an output signal to be asserted on the driving node of the combinational logic cluster. The output, or driving node of the combinational logic cluster, can then input to another registration stage. While this architecture makes for an effective, compact circuit, the timing analysis of such a circuit using existing timing tools is challenging. In embodiments, elements of the registration stage are duplicated, such that there is a set of normal pins and a set of dummy pins. For the purpose of analysis, the design is modified such that the output from the driving node of the combinational logic cluster is disconnected from the normal input of the following registration node, and instead is connected to a dummy input of the following registration node, thereby creating a path for timing purposes. This path can be analyzed using conventional timing tools. Based on the timing, optimizations are performed, such as selecting different sizes of various transistors to achieve an optimal balance between timing and power consumption. Based on the analysis, the production design is modified to use the new logic gate sizes, and the output of the combinational logic cluster is reconnected to the normal input of the following registration stage for the purposes of producing an actual integrated circuit product. In this way, effective timing analysis can be performed on asynchronous circuit designs.

Figure 1:
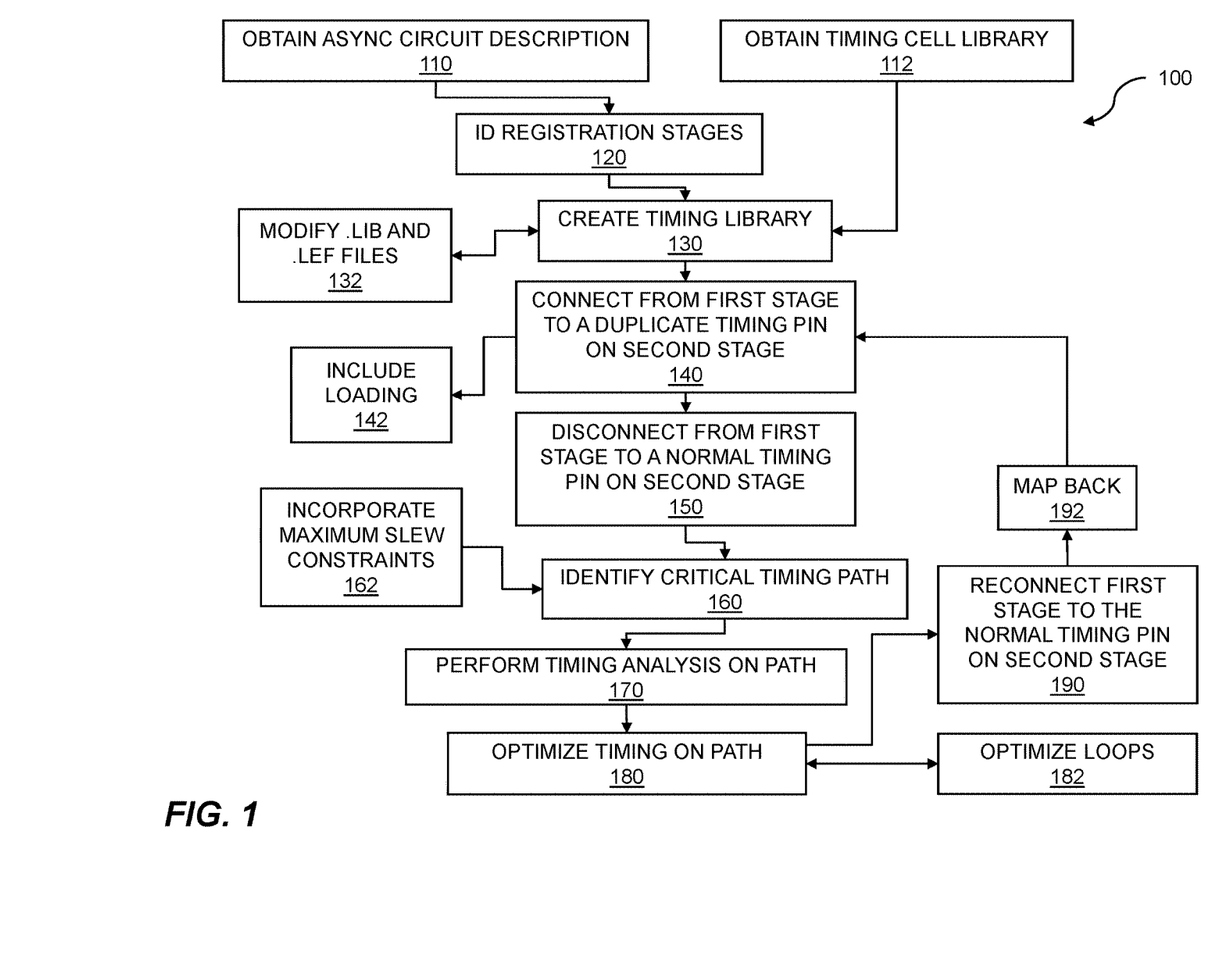
FIG. 1 is a flow diagram for timing analysis and optimization.

FIG. 1 is a flow diagram for timing analysis and optimization. The flow 100 shows a computer-implemented method for timing analysis and optimization. The flow begins with obtaining a description of an asynchronous circuit 110. This can include obtaining a description of an asynchronous circuit wherein the asynchronous circuit includes a timing loop. In order to analyze timing behavior of the timing loop, a temporary transformation is performed, which adds duplicate pins to registration stages and reconfigures the connections to have new paths that terminate at a duplicate connection. The new paths are analyzed for timing, and optimizations are performed to select appropriately sized devices and buffered nets to balance both timing and power consumption. Once the new device sizes are determined, the circuit is reconfigured to its original timing loop with the new device sizes. In embodiments, optimizing the selection of components within the asynchronous circuit to achieve preferred timing characteristics of the asynchronous circuit. In this way, an updated semiconductor mask set can be generated, and a timing-optimized asynchronous circuit can be manufactured.

In embodiments, the circuit description is obtained in a variety of formats, including, but not limited to, Verilog, VHDL, Library Exchange Format, OASIS, or another suitable format. The flow continues with the identifying of registration stages 120. The registration stages are logic circuits which may include AND gates, XOR gates, NOR gates, OR, gates, flip flops, and/or other logical gates. In embodiments, the registration stages are implemented with Null Convention Logic (NCL). The registration stages receive one or more input signals and produce an output signal when all input conditions are met, thus providing some gating and control of the circuit with a behavior similar to that of a latch. The registration stages can be part of a library of circuits, where metadata indicates that a circuit is a registration stage. Thus, the flow 100 includes identifying a plurality of registration stages 120 within the asynchronous circuit. The flow continues with creating a timing library 130. The timing library is a new library which contains timing data including signal propagation through the registration stages. The registration stages in the timing library are modified to include duplicate pins for the inputs and/or outputs. Thus, the flow 100 includes creating a new timing cell library 130 comprising cell models for the plurality of registration stages, wherein the new timing cell library has duplicate timing pins of normal pins on registration cells. In embodiments, the timing pins and duplicate timing pins are input pins and/or output pins.

The flow can include modifying .lib and .lef files 132. Thus, the flow 100 includes creating the new timing cell library wherein the new timing cell library includes modifying a .lib file and a .lef file 132 that describe connections and timings for cell models in the new timing cell library. The Library Exchange Format (LEF) is an open specification for representing physical layout information on components of an integrated circuit in an ASCII format. The .lef file can include physical properties of the fabrication process. For example, the .lef file can contain the number of metal layers, the design rules, resistances, capacitances, as well as the routing grid needed. The .lef file can include a technology section that includes information about design rules, via definitions, and metal capacitance. The .lef file can further include a macro section that includes cell descriptions, cell dimensions, and pin layout. The .lib file can include logical, timing, and electrical characteristics of a gate or macro library. These are used for both synthesizing a design and also for the place and route tool (and timing analysis). In some cases, the files can be supplied by the foundry or gate library vendor. In embodiments, the .lib and/or .lef files are modified and/or edited to create the duplicate pins of the registration stages as part of creating the timing library 130.

The flow continues with making a connection from a first stage to a duplicate timing pin on a second stage 140, and disconnecting (removing a connection) from a first stage to the normal timing pin on a second stage 150. The duplicate timing pins can be "dummy" pins on the registration stage that are not implemented in the realized integrated circuit design. Thus, the flow 100 includes connecting from a first registration stage, from the plurality of registration stages, through a first combinational delay path to a duplicate input timing pin on a second registration stage 140, from the plurality of registration stages. Additionally, the flow 100 includes disconnecting a connection from the first combinational delay path to a normal timing input pin on the second registration stage 150. In the flow 100, the connecting includes connecting a driving node from a last stage of the first combinational delay path to the duplicate input timing pin on the second registration stage. The driving node can be an output or final stage of a combinational logic circuit.

The flow 100 further includes obtaining a timing cell library 112, wherein the timing cell library is used in the generation of the new timing cell library. The timing cell library 112 can include timing information for standard cells and other logic circuitry. Information from the timing cell library 112 can be used as a starting point in the creation of the timing library 130. In the flow 100, the new timing cell library comprises cells from an original cell library in addition to the registration cells with the duplicate timing pins of the normal pins. The flow can include evaluating loading 142 of outputs of registration stages or other logic. The loading can include putting a capacitive load on a duplicate pin to simulate the capacitive loading that might be present in the actual circuit. This simulation can serve to provide more accurate results. Thus, the flow 100 further includes loading 142 on a duplicate output timing pin for the second registration stage corresponding to loading encountered by a normal output pin for the second registration stage. The flow continues with identifying a critical timing path 160. In embodiments, the critical timing path is a timing path that is the worst case, or slowest, timing path within a given circuit or portion of a circuit. Thus, the flow 100 further includes identifying a critical timing path 160 wherein the critical timing path includes the first registration stage through the first combinational delay path to the second registration stage. Factors including, but not limited to, cycle time, slew rate, positive and negative slack can be considered when performing the timing analysis. The timing analysis can utilize directed graphs, abstraction registers, timing cuts, arc analysis, false path identification, and other suitable techniques as inputs or consideration in deriving the timing analysis results.

The flow 100 further includes incorporating maximum slew constraints 162 for the input to the first registration stage. The slew rate reflects the shortest time required for a signal to change state (e.g. from logical "0" to logical "1", or vice versa). The slew rate is an important component of timing analysis. Slew is a function of unequal delay in distribution of a timing signal to various parts of a circuit. Factors contributing to slew include the number of gates/buffers within a path, as well as the delay caused by the conductive paths themselves. If a timing analysis is performed with a slew rate that is too fast, the results could be inaccurate. Hence, the slew rate can be capped at a maximum value to provide realistic simulation results. In the flow 100, a slew rate for an input to the first registration stage can correspond to a slew rate as seen on a duplicate input pin for the first registration stage. In embodiments, the slew rate on the original input pin is forced to match the slew rate of the dummy input pin.

The flow continues with performing a timing analysis on a path 170. The path can be the critical timing path previously identified. The path can include, as a starting point, an output of a first registration stage, continuing with a combinational logic circuit, and terminating at a duplicate input of a subsequent registration stage. Thus, the flow 100 includes performing timing analysis on a path 170 through the first registration stage through the first combinational delay path to the duplicate input timing pin on the second registration stage. The flow 100 further includes optimizing timing on the path 180 through the first registration stage through the first combinational delay path to the duplicate input timing pin on the second registration stage. The optimization can include selection of devices of differing sizes (gate width, length, etc.) for use in the combinational logic circuits and/or registration stages. The optimization includes updating the semiconductor design masks and fabricating an optimized asynchronous circuit. The flow 100 further includes reconnecting the first registration stage through the first combinational delay path to the normal input pin on the second registration stage in accordance with an original set of connections, after optimization of the first registration stage through the first combinational delay path to the second registration stage 190. This restores the connection to the path that is used for the actual realized circuit. The flow 100 further includes mapping back from registration cells 192, with duplicate timing pins, to registration cells without duplicate timings, wherein the registration cells without duplicate timing pins correspond to drive capabilities and timings of the registration cells with duplicate timing pins, after the timing analysis, as part of the reconnecting. The flow can then continue to the connecting from the first stage to a duplicate timing pin on a second stage 140, to continue the optimization process for additional iterations.

The flow 100 includes optimizing loops 182. Logic loops involve feedback from the output of a circuit back to one or more of the inputs. The loop can be directly connected to the one or more inputs or it can traverse many stages of logic before being fed back into the input. In synchronous designs, loops are discouraged or even forbidden because of the difficulty of timing an asynchronous loop within a synchronous design. Often, a loop is broken up with a flip-flop or register in a synchronous design. However, the disclosed concepts include optimizing loops within an asynchronous circuit design. Loops can exist within a block of logic that includes control logic. Loops can exist within a block of logic that is between two or more additional blocks of logic.

A high-level design language, such as Verilog, can be utilized to determine which loops within a design are the most activated within a logic design. The loops most activated (most frequently used) can be optimized for better overall timing closure and increased "hum" frequency. In synchronous logic timing closure, the overall clock rate is limited by the slowest path, because the slowest path will become non-functional if operated above its timing specification. However, in an asynchronous, self-timed design, if the circuit occasionally must wait for a seldom-used slowest path to execute, the design will still be functional.

An iterative process for timing optimization of various related timing paths can be employed. During the first iteration, a blind maximum delay can be applied to the segments of the timing path. The blind max delay is a simple maximum delay that is calculated based only on the circuit elements and, if available, placement information. More sophisticated timing analysis techniques, such as parasitic delay extraction, is not required for the first iteration. The design is thus not over-constrained by exacting timing requirements. In subsequent iterations, the max delay can be varied, either more pessimistically or more optimistically, in order to obtain a more optimal overall timing solution. Unnecessary logic can be removed from the timing paths, and the results can be mixed back into the design with the Verilog path description. The iterative process can be extended to the whole circuit by varying the maximum delay on each of the sections and thereby attacking each section in order to improve the overall timing solution. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
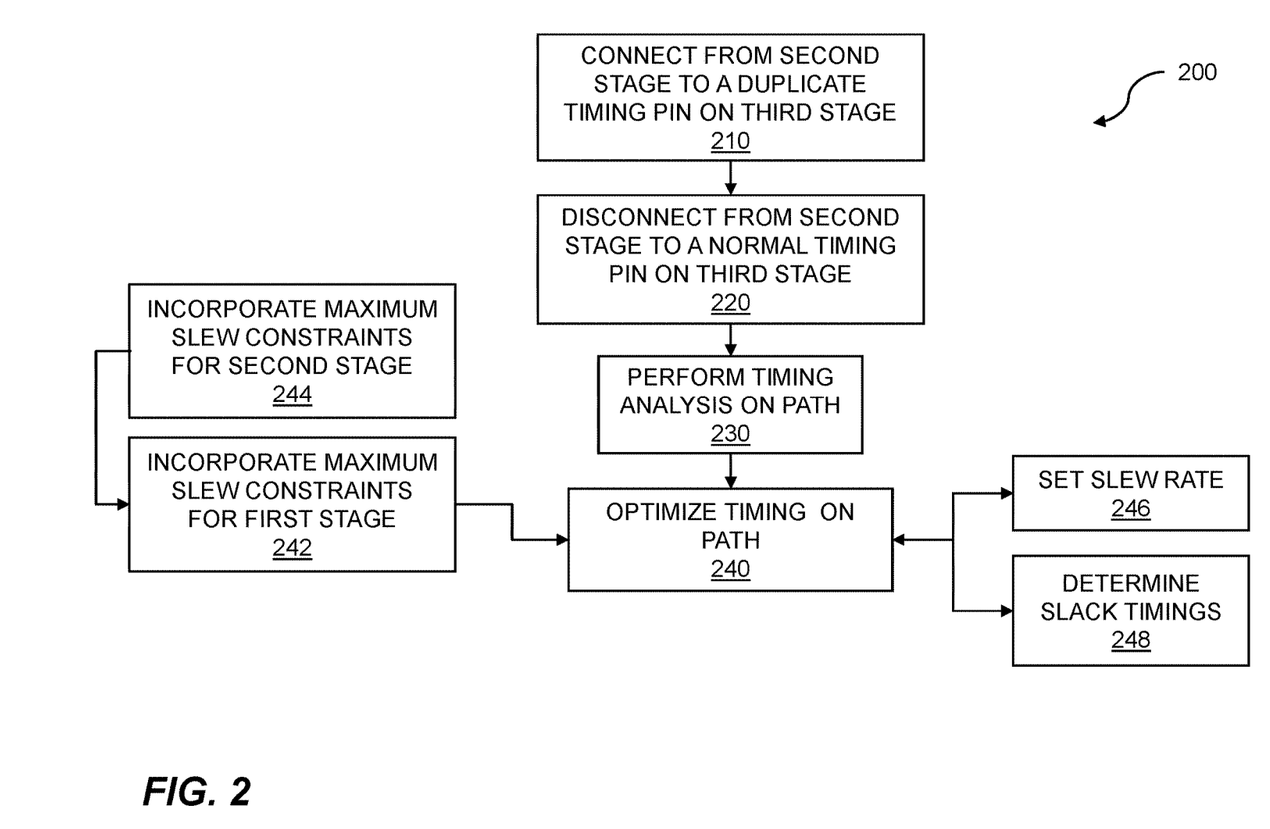
FIG. 2 is a flow diagram for second stage analysis and optimization.

FIG. 2 is a flow diagram for second stage analysis and optimization. The flow 200 includes connecting from the second registration stage through a second combinational delay path to a duplicate input timing pin on a third registration stage 210. The flow 200 includes disconnecting a connection from the second combinational delay path to a normal timing input pin on the third registration stage 220. The flow 200 includes performing timing analysis on a path 230 through the second registration stage through the second combinational delay path to the duplicate input timing pin on the third registration stage. The flow 200 further includes optimizing timing on the path 240 through the first registration stage through the first combinational delay path to the duplicate input timing pin on the second registration stage and through the second registration stage through the second combinational delay path to the duplicate input timing pin on the third registration stage.

Slew rate is the rate at which the output voltage of a device or circuit can change. The flow 200 can include setting a slew rate 246 for the normal input to the second registration stage corresponding to a slew rate determined on the duplicate input timing pin on the second registration stage. In the flow 200, the optimizing timing can include incorporating maximum slew constraints for a duplicate input timing pin to the first registration stage 242. Furthermore, in the flow 200, the optimizing timing can include incorporating maximum slew constraints for the duplicate input timing pin to the second registration 244.

Slack represents a measure of the difference between the required time and the arrival time of a signal at a given input.

A positive slack S at some node implies that the arrival time at that node may be increased by S, without affecting the overall delay of the circuit. Conversely, negative slack implies a signal has arrived too late, and thus, the path must be sped up if the entire circuit is to operate at the desired speed. In embodiments, the slack timings are optimized. The optimizing the slack timings can include limiting a positive slack timing. The flow 200 can include determining slack timings 248 for arrival to the duplicate input timing pin on the second registration stage and to the duplicate input timing pin on the third registration stage. In embodiments, the optimizing includes optimizing the slack timings for arrival to the duplicate input timing pin on the second registration stage and to the duplicate input timing pin on the third registration stage. The optimizing of the paths together allows for tradeoff between the various stages. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
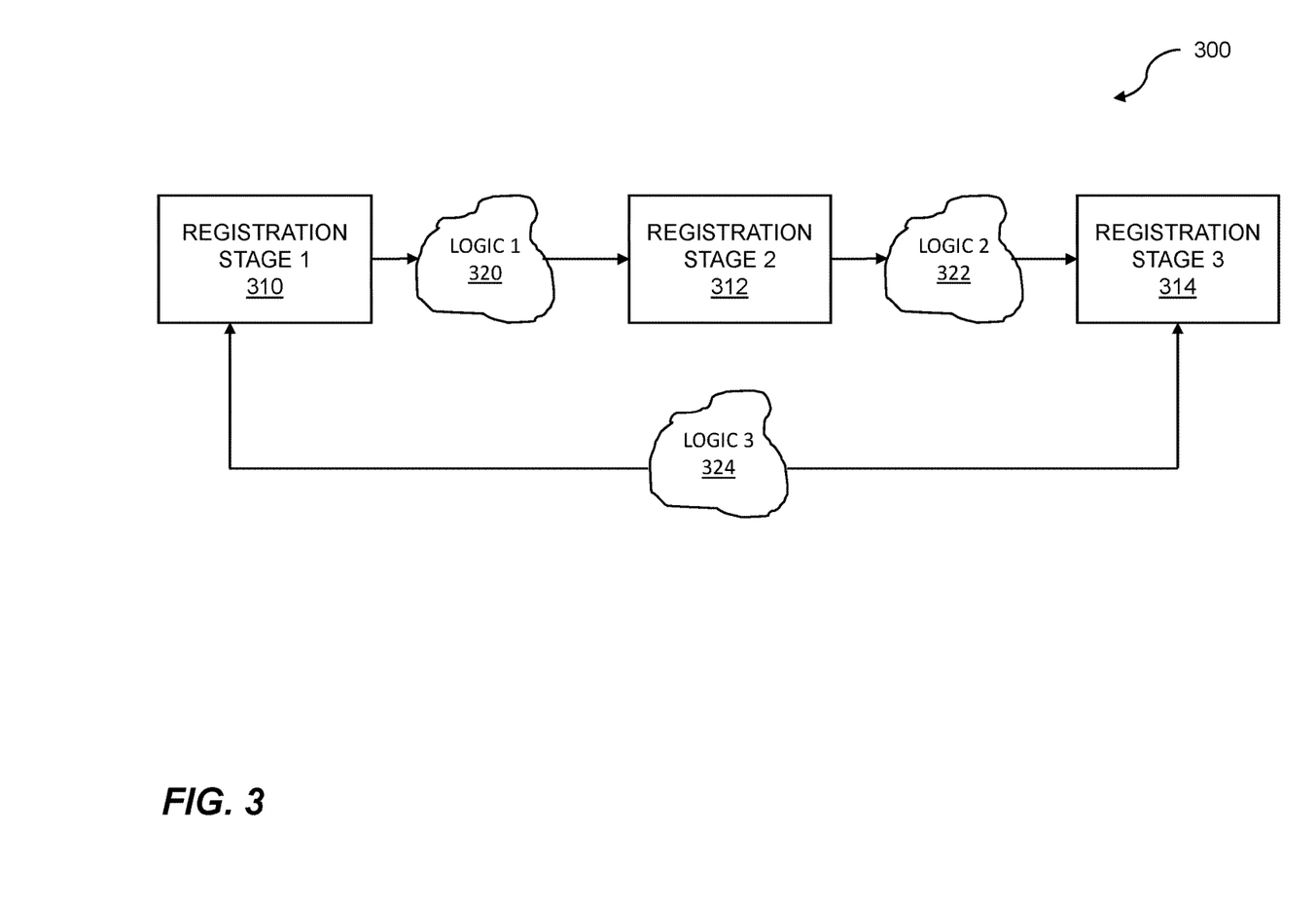
FIG. 3 is an example illustrating a circuit that needs optimization.

FIG. 3 is an example illustrating a circuit that needs optimization. A circuit 300 includes a first registration stage (cell) 310. The circuit 300 includes a first combinational logic circuit 320 or group of circuits. The output of the first registration stage 310 is input to the first combinational logic circuit 320. The circuit includes a second registration stage 312. The circuit 300 includes a second combinational logic circuit 322. The output of the second registration stage 312 is input to the second combinational logic circuit 322. The circuit includes a third registration stage 314. The circuit 300 includes a third combinational logic circuit 324. The output of the third registration stage 314 is input to the third combinational logic circuit 324. In order to perform a timing analysis on this circuit, which includes asynchronous portions, the circuit is modified to create new paths for performing the timing analysis. The process for creating the new paths is further described herein below.

Figure 4:
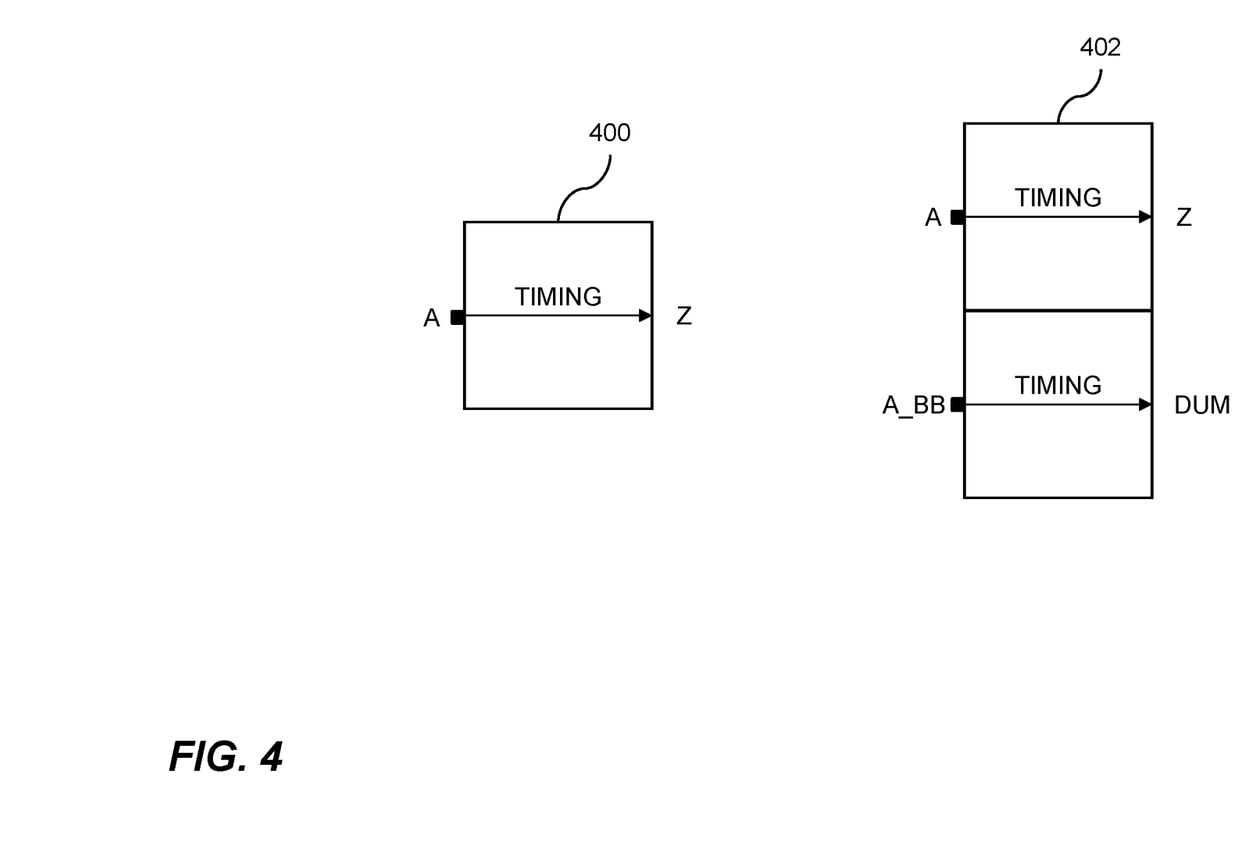
FIG. 4 is an example showing a registration cell and a registration cell with duplicated timing pins for connection.

FIG. 4 is an example showing a registration cell along with a registration cell with duplicated timing pins for connection. A registration cell 400 includes an input A and an output Z. A registration cell 402 is derived from the registration cell 400 but adds a duplicate input A_BB and a dummy duplicate output DUM. The pins A and Z of the registration cell 402 are referred to as normal pins. In embodiments, registration stages are comprised of a duplicated registration cell similar to that shown as 402, comprising a duplicate input and output. In embodiments, the creation of a duplicated registration cell includes modification of .lef and/or .lib files to duplicate the input and output pins. In LEF syntax, a pin definition can have the following format:

```
PIN pinName
FOREIGN foreignPinName [STRUCTURE [pt [orient] ] ] ;
[DIRECTION {INPUT | OUTPUT [TRISTATE] | INOUT |
FEEDTHRU} ;]
[USE { SIGNAL | ANALOG | POWER | GROUND | CLOCK } ;]
[SHAPE {ABUTMENT | RING | FEEDTHRU} ;]
[MUSTJOIN pinName ;]
{PORT
[CLASS {NONE | CORE} ;]
{layerGeometries} ...
END} ...
END pinName]
```

In embodiments, a parsing script duplicates input and output pins that are defined by the syntax above. The duplicated output pins can be left in an unconnected state, or they can be connected to a capacitive load to provide a more realistic timing simulation. The registration cell 402 can be used as a registration stage in a circuit.

Figure 5:
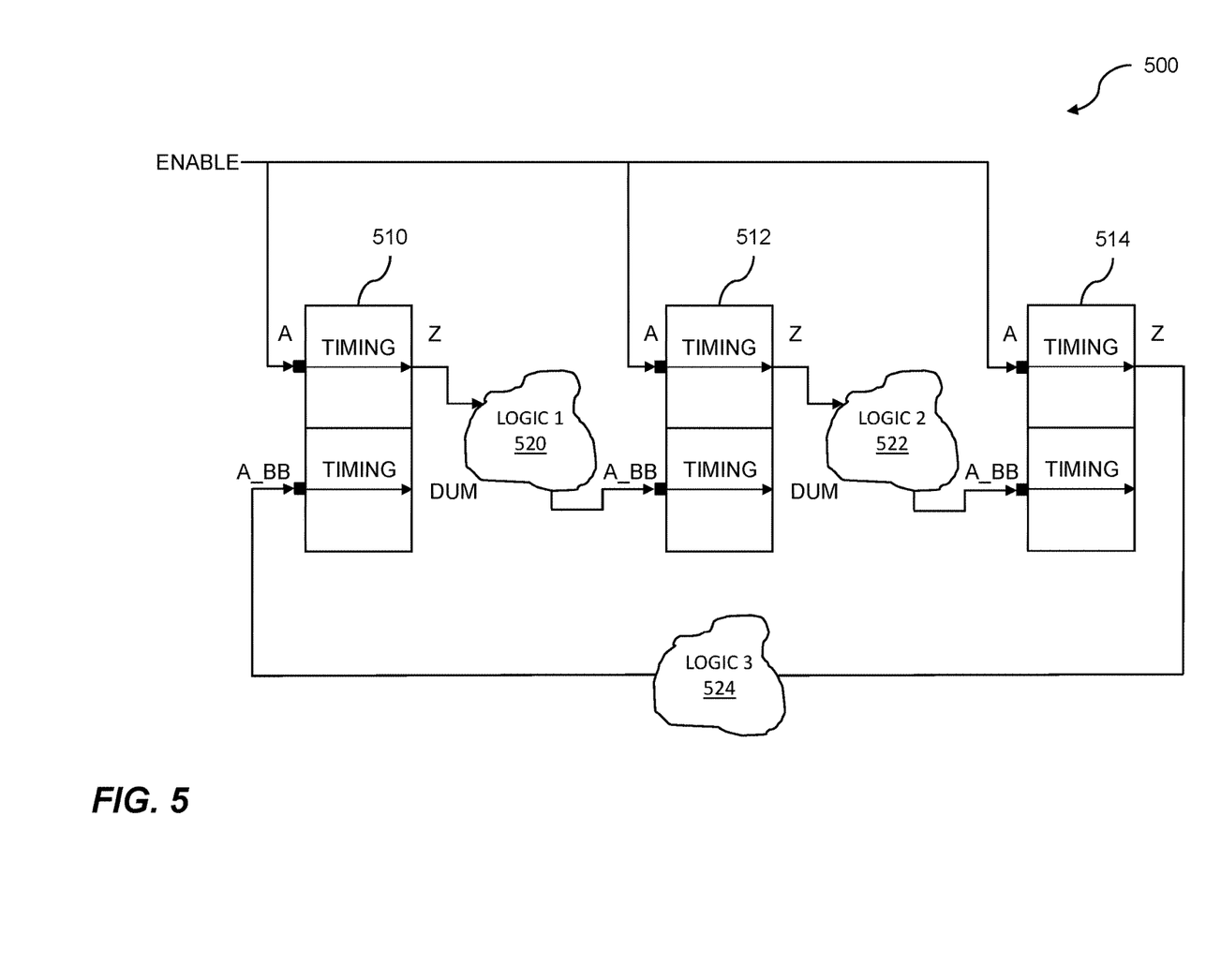
FIG. 5 is an example illustrating a loop with paths for timing purposes.

FIG. 5 is an example illustrating a loop with paths for timing purposes. The example 500 is derived from the example 300 of FIG. 3. However, each registration stage of FIG. 3 is replaced with a registration cell with duplicated timing pins. Hence, the registration stage 310 of FIG. 3 is replaced with a registration stage 510 of FIG. 5. Similarly, the registration stage 312 of FIG. 3 is replaced with a registration stage 512 of FIG. 5, and the registration stage 314 of FIG. 3 is replaced with a registration stage 514 of FIG. 5. The logic circuits 320, 322, and 324 of FIG. 3 can be substantially similar to the respective logic circuits 520, 522, and 524 of FIG. 5.

An Enable signal provides input to an input A of the registration stages 510, 512, and 514. In many cases, this Enable signal is considered a timing origin of all paths for timing analysis purposes. A timing analysis is performed between an output port Z of the registration stage 510, through the logic circuit 1 520, to a duplicate input pin A_BB of the registration stage 512. Similarly, a timing analysis is performed between an output port Z of the registration stage 512, through a logic circuit 2 522, to a duplicate input pin A_BB of the registration stage 514, and a timing analysis is performed between an output port Z of the registration stage 514, through a logic circuit 3 524, to the duplicate input pin A_BB of the registration stage 510. In some embodiments, the duplicate output pin, indicated as DUM, is left unconnected. In other embodiments, the DUM output pins are connected to a capacitive load for the purposes of timing analysis.

The example 500 can include identifying a plurality of registration stages within the asynchronous circuit. Furthermore, the example 500 can include connecting from a first registration stage, from the plurality of registration stages, through a first combinational delay path to a duplicate input timing pin on a second registration stage, from the plurality of registration stages. The example 500 can further include disconnecting a connection from the first combinational delay path to a normal timing input pin on the second registration stage. The example 500 can include performing timing analysis on a path through the first registration stage through the first combinational delay path to the duplicate input timing pin on the second registration stage. In the example 500, the connecting can include a connection for timing analysis purposes only. An example of such a connection is the connection between the output port Z of the registration stage 514, through the logic circuit 3 524, to the duplicate input pin A_BB of the registration stage 510. In the actual realized circuit, that connection might not be present, and the duplicate pins of the registration stage might not be present.

Figure 6:
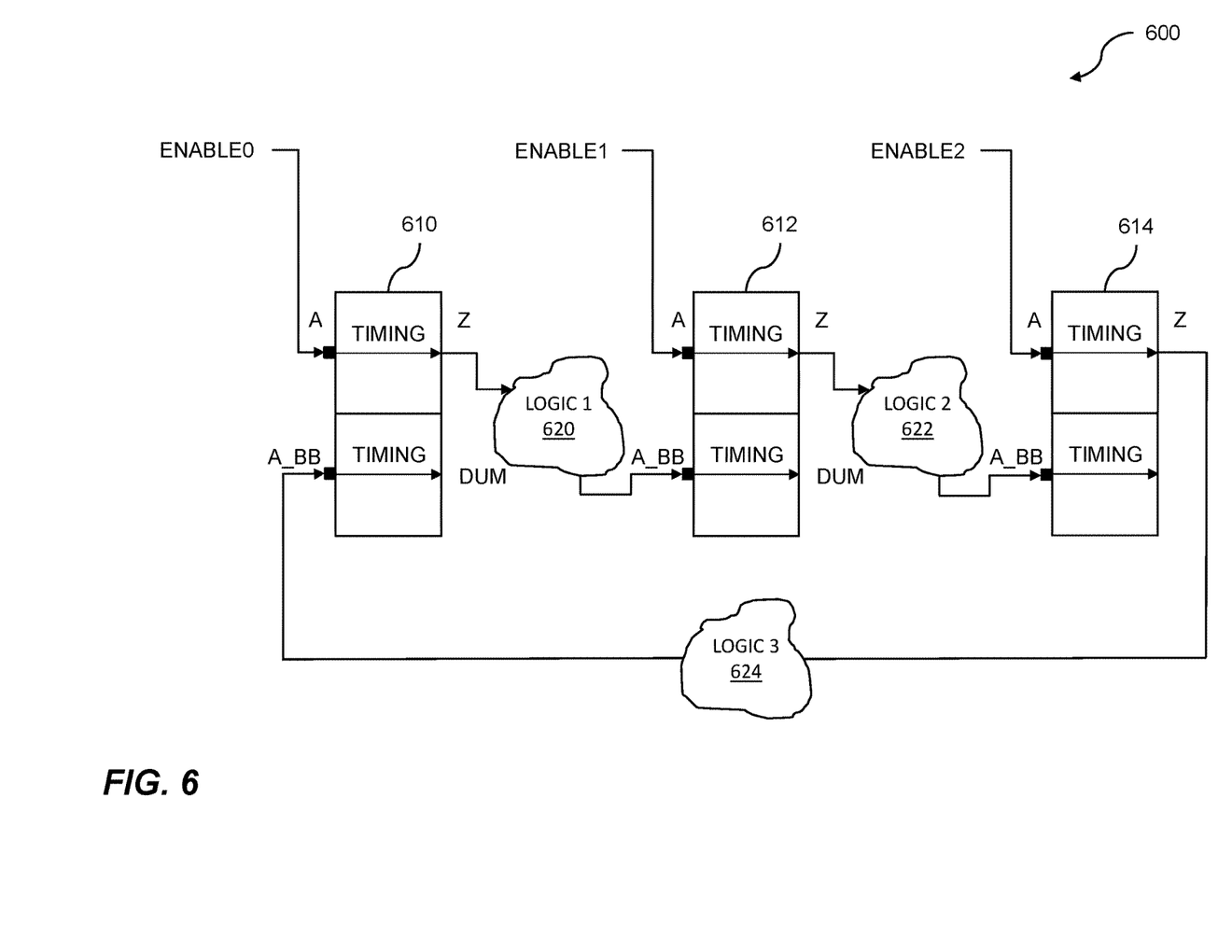
FIG. 6 is an example showing paths with multiple enable inputs.

FIG. 6 is an example showing paths with multiple enable inputs. In the example 600, a first enable input Enable0 provides a signal to input A of a registration stage 610, a second enable input Enable1 provides a signal to input A of a registration stage 612, and a third enable input Enable2 provides a signal to input A of a registration stage 614. In some embodiments, each enable input has a different slew rate. In a manner similar to the one described for FIG. 5, a timing analysis is performed between an output port Z of the registration stage 610, through a logic circuit 1 620, to a duplicate input pin A_BB of the registration stage 612.

Similarly, a timing analysis is performed between an output port Z of the registration stage 612, through a logic circuit 2 622, to a duplicate input pin A_BB of the registration stage 614, and a timing analysis is performed between an output port Z of the registration stage 614, through a logic circuit 3 624, to a duplicate input pin A_BB of the registration stage 610. In some embodiments, the duplicate output pin, indicated as DUM, is left unconnected. In other embodiments, the DUM output pins are connected to a capacitive load for the purposes of timing analysis.

The example 600 can include obtaining a description of an asynchronous circuit wherein the asynchronous circuit includes a timing loop. The example 600 can include identifying a plurality of registration stages within the asynchronous circuit. The example 600 can include creating a new timing cell library comprising cell models for the plurality of registration stages, wherein the new timing cell library has duplicate timing pins of normal pins on registration cells. The example 600 can further include connecting from a first registration stage, from the plurality of registration stages, through a first combinational delay path to a duplicate input timing pin on a second registration stage, from the plurality of registration stages. The example 600 can include disconnecting a connection from the first combinational delay path to a normal timing input pin on the second registration stage. The example 600 can include performing timing analysis on a path through the first registration stage through the first combinational delay path to the duplicate input timing pin on the second registration stage.

In embodiments, timing optimizations are performed on a circuit with timing paths such as was previously shown in example 500 of FIG. 5 and example 600 of FIG. 6. Once the timing optimizations are performed, and the desired sizes of the various gates are selected (based on the results of the timing analysis), the circuit is reverted to its original connection configuration as shown in example 300 of FIG. 3. However, the new circuit might have different devices in the combinational logic and/or registration stages. Thus, paths can be created solely for timing analysis, and those paths might not be used or present at all in the actual fabricated semiconductor circuit.

Figure 7:
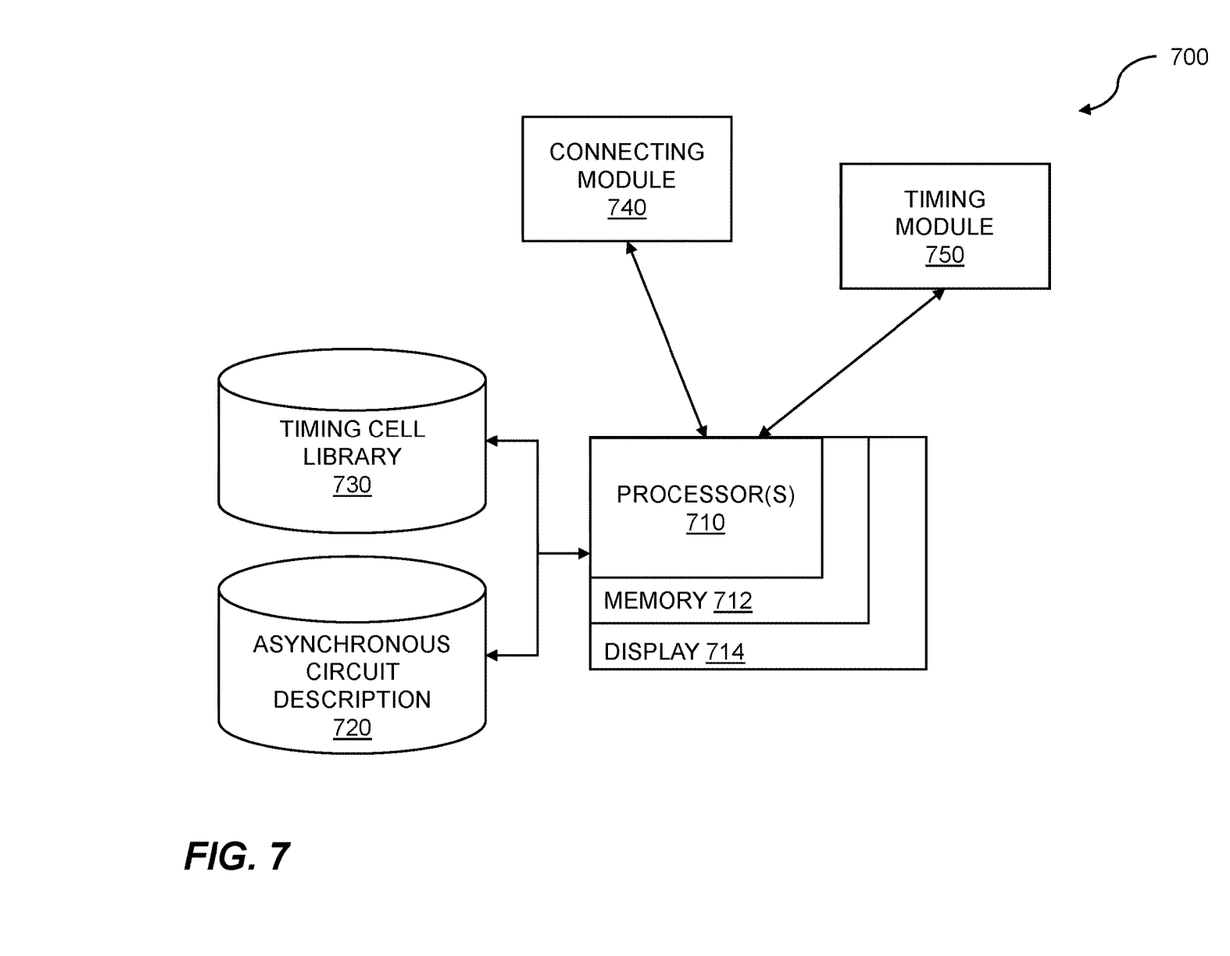
FIG. 7 illustrates a system for timing optimization of asynchronous circuit designs.

FIG. 7 illustrates a system for timing optimization of asynchronous circuit designs. The system 700 can include one or more processors 710 which are coupled to a memory 712. The memory 712 can be used for storing instructions, for storing program descriptions, for storing sub-routines of functions, for system support, for help information, and the like. The memory can contain code data in a data format used for the exchange of program data (e.g. information stored in assembly language format, electronic design automation (EDA) format, or any other suitable format for storing program data). This can include data stored in the Library Exchange Format. The one or more processors 710 can read in information regarding one or more asynchronous circuit descriptions 720 including layouts, device geometries, metallization layers, pins, passive components, logic devices, and other information, including information from a timing cell library 730. The processors 710 can perform connections and disconnections using a connecting module 740. The processors 710 can perform timing analysis on circuits using a timing module 750. The timing analysis can be performed on circuits that are first reconfigured using the connecting module 740. Once the timing analysis is performed, the processors 710 can utilize the connecting module 740 to reconnect to a configuration for producing an actual integrated circuit. The asynchronous circuit descriptions 720 can be represented in the form of digital data stored on a physical storage medium such has a hard disk drive (HDD), a solid state drive (SSD), and so on. The digital data can be in the form of a library, a database, etc. Similarly, the functions within the timing cell library 730 can be represented in the form of digital data and stored on a physical storage medium such as a hard drive, solid state drive, etc.

In embodiments, one or more of the asynchronous circuit descriptions 720, and/or the timing cell library 730 are interconnected via the Internet. Cloud computing can be used to perform the timing analysis on circuits derived from the asynchronous circuit description 720. Information about the various designs can be shown on a display 714 which can be attached to the one or more processors 710. The display 714 can be any electronic display, including but not limited to, a computer display, a laptop screen, a net-book screen, a tablet screen, a cell phone display, a mobile device display, a remote with a display, a television, a projector, and the like.

Once the system performs the timing analysis, it can then be determined, based on the results of the timing analysis, what the optimal sizes for devices in the combinational logic circuits and/or registration stages should be. The sizes of the devices affects the switching times. For example, an inverter within a combinational logic circuit might have a two-micron wide PFET (P-type field effect transistor) and a one-micron wide NFET (N-type field effect transistor). As a result of the timing analysis, that inverter can be replaced with another inverter that functions similarly, but has a ten-micron wide PFET and a five-micron wide NFET. The bigger device can handle more power and can reduce switching times. However, larger devices consume more power, so it is desirable to pick device sizes that are large enough to meet the timing requirements, but not larger than necessary. Disclosed embodiments allow such an analysis to be performed on asynchronous circuit designs. In some embodiments, .lib and/or .lef files are modified to include information regarding the new device sizes, and a circuit design is fabricated based on the new device sizes. Based on the modified .lib/.lef files, a new netlist can be generated, followed by a physical design and layout steps of a typical semiconductor fabrication process to allow fabrication of a circuit that includes asynchronous circuits which have had a timing analysis performed thereon.

The system 700 can include computer program product embodied in a non-transitory computer readable medium for analysis. The computer program product comprises code which causes one or more processors to perform operations of: obtaining a description 720 of an asynchronous circuit wherein the asynchronous circuit includes a timing loop; identifying a plurality of registration stages within the asynchronous circuit; creating a new timing cell library 730 comprising cell models for the plurality of registration stages wherein the new timing cell library has duplicate timing pins of normal pins on each cell; connecting from a first registration stage, from the plurality of registration stages, through a first combinational delay path to a duplicate input timing pin on a second registration stage, from the plurality of registration stages; disconnecting a connection from the first combinational delay path to a normal timing input pin on the second registration stage; and performing timing analysis on a path through the first registration stage through the first combinational delay path to the duplicate input pin.

Each of the above methods may be executed on one or more processors on one or more computer systems. Embodiments may include various forms of distributed computing, client/server computing, and cloud based computing. Further, it will be understood that the depicted steps or boxes contained in this disclosure's flow charts are solely illustrative and explanatory. The steps may be modified, omitted, repeated, or re-ordered without departing from the scope of this disclosure. Further, each step may contain one or more sub-steps. While the foregoing drawings and description set forth functional aspects of the disclosed systems, no particular implementation or arrangement of software and/or hardware should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. The elements and combinations of elements in the block diagrams and flow diagrams, show functions, steps, or groups of steps of the methods, apparatus, systems, computer program products and/or computer-implemented methods. Any and all such functions—generally referred to herein as a "circuit," "module," or "system"—may be implemented by computer program instructions, by special-purpose hardware-based computer systems, by combinations of special purpose hardware and computer instructions, by combinations of general purpose hardware and computer instructions, and so on.

A programmable apparatus which executes any of the above mentioned computer program products or computer-implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are neither limited to conventional computer applications nor the programmable apparatus that run them. To illustrate: the embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized including but not limited to: a non-transitory computer readable medium for storage; an electronic, magnetic, optical, electromagnetic, infrared, or semiconductor computer readable storage medium or any suitable combination of the foregoing; a portable computer diskette; a hard disk; a random access memory (RAM); a read-only memory (ROM), an erasable programmable read-only memory (EPROM, Flash, MRAM, FeRAM, or phase change memory); an optical fiber; a portable compact disc; an optical storage device; a magnetic storage device; or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed approximately simultaneously to enhance utilization of the processor and to facilitate substantially simultaneous functions. By way of implementation, any and all methods, program codes, program instructions, and the like described herein may be implemented in one or more threads which may in turn spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the causal entity.

While the invention has been disclosed in connection with preferred embodiments shown and described in detail, various modifications and improvements thereon will become apparent to those skilled in the art. Accordingly, the forgoing examples should not limit the spirit and scope of the present invention; rather it should be understood in the broadest sense allowable by law.

What is claimed is:

1. A computer-implemented method for timing optimization comprising:
    obtaining a description of an asynchronous circuit wherein the asynchronous circuit includes a timing loop;
    identifying a plurality of registration stages within the asynchronous circuit;
    creating a new timing cell library comprising cell models for the plurality of registration stages wherein the new timing cell library has duplicate timing pins of normal pins on registration cells;

connecting from a first registration stage, from the plurality of registration stages, through a first combinational delay path to a duplicate input timing pin on a second registration stage, from the plurality of registration stages;

disconnecting a connection from the first combinational delay path to a normal timing input pin on the second registration stage; and performing timing analysis on a path through the first registration stage through the first combinational delay path to the duplicate input timing pin on the second registration stage.

2. The method of claim 1 wherein the connecting includes connecting a driving node from a last stage of the first combinational delay path to the duplicate input timing pin on the second registration stage.

3. The method of claim 1 wherein the new timing cell library comprises cells from an original cell library, in addition to the registration cells with the duplicate timing pins of the normal pins.

4. The method of claim 1 further comprising obtaining a timing cell library wherein the timing cell library is used in generation of the new timing cell library.

5. The method of claim 1 wherein the creating the new timing cell library includes modifying a .lib file and a .lef file that describe connections and timings for cell models in the new timing cell library.

6. The method of claim 1 further comprising optimizing timing on the path through the first registration stage through the first combinational delay path to the duplicate input timing pin on the second registration stage.

7. The method of claim 1 wherein the connecting includes a connection for timing analysis purposes only.

8. The method of claim 1 further comprising connecting from the second registration stage through a second combinational delay path to a duplicate input timing pin on a third registration stage.

9. The method of claim 8 further comprising disconnecting a connection from the second combinational delay path to a normal timing input pin on the third registration stage.

10. The method of claim 9 further comprising performing timing analysis on a path through the second registration stage through the second combinational delay path to the duplicate input timing pin on the third registration stage.

11. The method of claim 10 further comprising optimizing timing on the path through the first registration stage through the first combinational delay path to the duplicate input timing pin on the second registration stage and through the second registration stage through the second combinational delay path to the duplicate input timing pin on the third registration stage.

12. The method of claim 11 wherein the optimizing timing includes incorporating maximum slew constraints for a duplicate input timing pin to the first registration stage.

13. The method of claim 12 wherein the optimizing timing includes incorporating maximum slew constraints for the duplicate input timing pin to the second registration stage.

14. The method of claim 11 further comprising setting a slew rate for the normal timing input pin to the second registration stage corresponding to a slew rate determined on the duplicate input timing pin on the second registration stage.

15. The method of claim 11 further comprising determining slack timings for arrival to the duplicate input timing pin on the second registration stage and to the duplicate input timing pin on the third registration stage.

16. The method of claim 15 further comprising optimizing the slack timings for arrival to the duplicate input timing pin on the second registration stage and to the duplicate input timing pin on the third registration stage.

17. The method of claim 16 wherein the optimizing the slack timings includes limiting a positive slack timing.

18. The method of claim 1 further comprising including loading on a duplicate output timing pin for the second registration stage corresponding to loading encountered by a normal output pin for the second registration stage.

19. The method of claim 1 wherein a slew rate for an input to the first registration stage corresponds to a slew rate as seen on a duplicate input pin for the first registration stage.

20. The method of claim 1 further comprising reconnecting the first registration stage through the first combinational delay path to a normal input pin on the second registration stage in accordance with an original set of connections, after optimization of the first registration stage through the first combinational delay path to the second registration stage.

21. The method of claim 20 further comprising mapping back from registration cells, with duplicate timing pins, to registration cells without duplicate timings, wherein the registration cells without duplicate timing pins correspond to drive capabilities and timings of the registration cells with duplicate timing pins, after timing analysis, as part of the reconnecting.

22. The method of claim 1 further comprising identifying a critical timing path wherein the critical timing path includes the first registration stage through the first combinational delay path to the second registration stage.

23. The method of claim 22 further comprising incorporating maximum slew constraints for an input to the first registration stage.

24. The method of claim 1 further comprising optimizing selection of components within the asynchronous circuit to achieve preferred timing characteristics of the asynchronous circuit.

25. A computer program product embodied in a non-transitory computer readable medium for timing optimization, the computer program product comprising code which causes one or more processors to perform operations of:

obtaining a description of an asynchronous circuit wherein the asynchronous circuit includes a timing loop;

identifying a plurality of registration stages within the asynchronous circuit;

creating a new timing cell library comprising cell models for the plurality of registration stages wherein the new timing cell library has duplicate timing pins of normal pins on each cell;

connecting from a first registration stage, from the plurality of registration stages, through a first combinational delay path to a duplicate input timing pin on a second registration stage, from the plurality of registration stages;

disconnecting a connection from the first combinational delay path to a normal timing input pin on the second registration stage; and performing timing analysis on a path through the first registration stage through the first combinational delay path to the duplicate input timing pin.

26. A computer system for timing optimization comprising:

a memory which stores instructions;

one or more processors coupled to the memory wherein the one or more processors, when executing the instructions which are store, are configured to:

obtain a description of an asynchronous circuit wherein the asynchronous circuit includes a timing loop;

identify a plurality of registration stages within the asynchronous circuit;

create a new timing cell library comprising cell models for the plurality of registration stages wherein the new timing cell library has duplicate timing pins of normal pins on registration cells;

connect from a first registration stage, from the plurality of registration stages, through a first combinational delay path to a duplicate input timing pin on a second registration stage, from the plurality of registration stages;

disconnect a connection from the first combinational delay path to a normal timing input pin on the second registration stage; and perform timing analysis on a path through the first registration stage through the first combinational delay path to the duplicate input timing pin on the second registration stage.

* * * * *

UNITED STATES PATENT AND TRADEMARK OFFICE
CERTIFICATE OF CORRECTION

PATENT NO. : 10,318,691 B2
APPLICATION NO. : 15/628307
DATED : June 11, 2019
INVENTOR(S) : Philippe Francis Sarrazin and Roger David Carpenter Page 1 of 1

It is certified that error appears in the above-identified patent and that said Letters Patent is hereby corrected as shown below:

In the Claims

In Claim 26, Column 16, Line 67, replace the word "store" with the word "stored".

Signed and Sealed this
Twenty-first Day of April, 2020

Andrei Iancu
*Director of the United States Patent and Trademark Office*